United States Patent Office 3,431,200
Patented Mar. 4, 1969

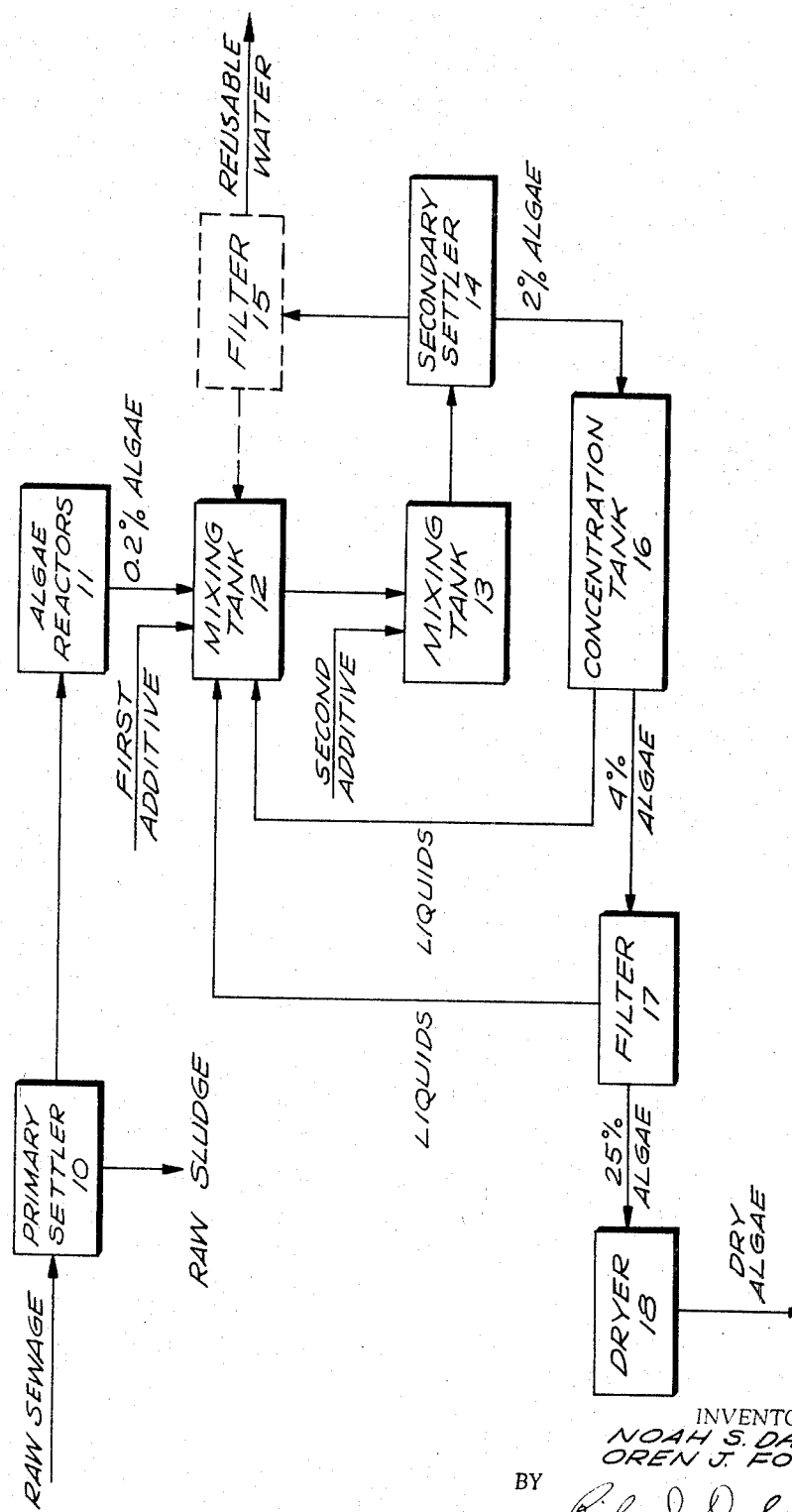

3,431,200
FLOCCULATION OF SUSPENSIONS
Noah S. Davis, Northridge, and Oren J. Foust, Granada Hills, Calif., assignors to North American Rockwell Corporation, a corporation of Delaware
Filed June 13, 1967, Ser. No. 645,816
U.S. Cl. 210—10                                 18 Claims
Int. Cl. B01d 21/01; A01h 13/00; C02b 1/20

ABSTRACT OF THE DISCLOSURE

A process is described for treating waste material for reducing the organic content thereof and recovering reusable water. Algae are photosynthetically grown in the wastes and the algae is recovered from the resultant slurry as an economically valuable product. In order to remove the algae from the slurry it is flocculated by sequential additions of calcium chloride and sodium hydroxide for producing calcium hydroxide in the suspension in a concentration below the solubility limit of calcium hydroxide. Such sequential additions induce instantaneous flocculation of the algae and permit ready settling and filtering thereof without introducing potentially toxic flocculating agents in the resultant product. Flocculation of other suspensions is also described.

Background

One of the substantial problems in the treatment of waste products such as municipal or industrial sewage comprises the disposition of organic materials. A process often employed for sewage treatment comprises aerobic digestion to produce activated sludge which comprises principally bacterial microorganisms which must be disposed of. These microorganisms may be digested anaerobically to reduce the volume thereof, or used directly for land fill or fertilizer. The activated sludge or digested activated sludge may also be oxidized or incinerated to reduce the organic content thereof. The oxidation products are then disposed of into the atmosphere or bodies of water, and have no economic value. In many instances the remaining ash must still be disposed of.

A process has been proposed for photosynthetic conversion of sewage by means of algae grown thereon. In this process shallow reactors are employed for growing algae employing sewage as a nutrient. The algae are subsequently separated from the liquid and may be employed as animal food, for example. In the process of separating the algae from the liquid a chemical material such as alum, which coagulates or flocculates the algae, is often employed to prepare the material for filtering or other separation techniques. A difficulty is encountered, however, since the alum contaminates the final algae product and may be toxic if the material is employed as animal feed. Such algae growth process is described in U.S. Patent 2,867,945.

The separation of algae from the suspending liquid is but one example of suspensions wherein it is desirable to remove the solids from suspension without any contamination thereof. Conventional flocculation processes have involved additions of materials that are solid or form solids that accompany the suspended solids when separated from the liquid or comprise materials adsorbed on the solids and removed therewith.

Thus, for example, prior flocculating agents have included complex organic materials adsorbed on the suspended solids for inducing flocculation thereof. Other flocculating agents have comprised formation or addition of insoluble aluminum hydroxide, iron hydroxide, or calcium hydroxide above the solubility limit, all of which accompany the flocculated solids and are separated from the liquid therewith. These flocculating agents in the solids are contaminants that minimize the usefulness of the solid product or increase the cost of recovery by requiring expensive extraction techniques.

Processes for treatment of sewage are described and claimed in copending U.S. patent applications Ser. No. 645,818 entitled "Waste Treatment Process with Recycling of Lime" by Noah S. Davis, Oren J. Foust and Thomas W. Withers, and Ser. No. 645,817 entitled "Waste Treatment Process with Recycling of Flocculating Agents" by Noah S. Davis and Oren J. Foust.

Brief summary of the invention

Thus, there is provided in the practice of this invention according to a preferred embodiment, a process for removing suspended solids from a liquid by sequentially adding calcium chloride and sodium hydroxide for forming calcium hydroxide in a concentration below the solubility limit thereof in order to produce instantaneous flocculation of the solids. Such a process may be practiced in combination with waste treatment employing algae photosynthesis for separating the algae product. Control of settling time can be employed for minimizing contamination of the solid product.

Objects and many of the attendant advantages of this invention will be appreciated as the same becomes better understood from the following detailed description when considered in connection with the drawing which comprises a flow diagram of a waste treatment process including a process for recovering algae from a suspension thereof.

In the practice of this invention according to a preferred embodiment, there is provided a process for treating waste materials such as sewage by photosynthetically growing algae therein and separating the algae as as illustrated by the accompanying figure. As illustrated therein raw sewage is fed to a primary settler 10. The raw sewage preferably comprises waste products from an industrial process such as a paper mill or abattoir, which introduces substantial amounts of organic materials into waste waters. The raw sewage ran also be municipal or domestic sewage which is usually somewhat lower in organic content. The primary settler 10 is employed in conventional sewage treatment for removing readily settable matter such as silt and the like, and for skimming off floating debris, grease and fats. The resultant slurry is known as raw sludge and is normally disposed of as land fill or may be recycled in certain processes to reduce the organic content thereof before being applied as land fill.

The liquid effluent from the primary settler 10 contains finely divided solids and dissolved organic materials and in the process provided in the practice of this invention the effluent is passed to an algae reactor 11. The algae reactor is preferably a shallow pond having a substantial area so that the algae growing therein are exposed to sunlight. Algae are photosynthetic organisms that employ the suspended and dissolved organic materials as nutrients. In feeding on these organic materials the concentration thereof is reduced and the organic material is converted to algal cells. Typical algae reactors are described in aforementioned U.S. Patent No. 2,867,945. It will be apparent that a variety of conventional pumps, weirs, valves, and the like are employed in such a system and that automatic or manual control can be used as desired.

After photosynthetic processing in the algae reactors 11 the slurry typically contains about 0.2% algae cells dispersed therein. This material is a very dilute suspension containing too much water for economic filtration. It is therefore desirable to flocculate or coagulate the algae for enhancing the settleability and filterability thereof. In the preferred process the slurry from the algae reactors is passed to a first mixing tank 12 where the first flocculating additive is introduced. The mixing tank may comprise a mechanically stirred or air agitated mixer or may merely comprise a channel or conduit wherein the flowing mixture is subject to turbulent flow. The first flocculating agent which preferably comprises calcium chloride, as hereinafter described, is added to the algae slurry and thoroughly mixed therewith. Sequentially thereafter the slurry may be passed to a second mixing tank 13 or passed further along a turbulent channel which serves as a mixing vessel and a second flocculating additive is mixed with the slurry. The second flocculating additive preferably comprises sodium hydroxide, as hereinafter described. Upon addition of sodium hydroxide to the slurry containing calcium chloride it is found that substantially instantaneous flocculation of the algae occurs.

The flocculated algae in the liquid is then passed to a secondary settler 14. The secondary settler 14 comprises a conventional thickener or the like wherein the flow rate of liquid is relatively low and particles and flocculated clumps of algae therein can settle out. The clear effluent from the secondary settler has a sufficiently low Biological Oxygen Demand that it can be discharged directly into streams, lakes, or the ocean as water reusable for recreational purposes. If desired, the effluent from the secondary settler 14 may be filtered in a sand filter 15, or the like, in order to remove any tiny traces of solids remaining therein. This additional step is found to be unnecessary in most situations and the water from the secondary settler can be discharged directly into a river or the like. Any solids remaining on the filter 15 can be recycled to the mixing tank 12 for flocculation.

The settled slurry from the secondary settler 14 comprises about 2% algae in water and is preferably passed to a concentration tank 16 which may also comprise a conventional thickener or the like. This permits economical removal of substantial amounts of water from the slurry and these liquids may be recycled to the mixing tank 12 for final removal of any small amounts of floating algae therein. In a typical operation the slurry from the concentration tank 16 comprises about 4% algae in water and is passed to a conventional vacuum filter 17, or the like, wherein most of the water is removed from the slurry. The liquid removed can preferably be recycled from the filter 17 to the mixing tank 12. It is preferred to recycle the liquid into the mixing tank rather than at a point prior to the algae reactors 11 since the calcium chloride and sodium hydroxide added to the slurry to induce flocculation thereof may interfere with metabolism of the algae.

The filter cake from the filter 17 which is about 25% algae and 75% water is preferably dried in a conventional rotary dryer or the like so that a completely dry algae product is produced. In some climatic situations air drying on shallow beds has been found suitable in lieu of forced drying. In either instance it is desirable to keep the temperature of the algae at a minimum during drying thereof in order to minimize damage to the desirable proteins therein. Thus a highly desirable dryer provides co-current flow of gas and algae so that the wet algae is subjected to the more elevated temperatures and the dry algae is subjected to relatively lower temperatures for minimizing damage thereto.

It is found that the dry algae has a very high protein content and forms a very desirable animal feed. Thus, for example, dry algae produced from municipal sewage has been fed to chickens and is found to be comparable with soybean meal in nutritional value. Thus, the process hereinabove described not only disposes of waste organic materials but also produces a valuable economic product.

Prior processes for flocculating and separating algae have involved the use alum or complex organic flocculating agents both of which contaminate the resultant algae product. The organic flocculating agents are tolerable in animal feed in reasonable quantity but are expensive in use. The use of alum in quantities necessary for flocculation may be toxic to animals. Similarly prior uses of calcium hydroxide and ferric hydroxide have exceeded the solubility limit thereof and produced nutritionally undesirable solid materials in the flocculated algae product as a filter to aid to enhance the filterability thereof.

However, it has been found in the practice of this invention that by introducing calcium chloride and sodium hydroxide sequentially to form calcium hydroxide in situ in the suspension, that concentrations substantially below the solubility limit of calcium hydroxide give rapid and effective flocculation without contamination of the solid algae product after drying. Thus the product of this process is usable directly as an animal feed and does not contain toxic products.

It is preferred in the practice of this invention to add calcium chloride first, and sequentially thereafter, add sodium hydroxide. It is found that when this order of addition is employed better flocculation is obtained and a somewhat drier filter cake results; the technique is, however, operable with the order of addition reversed. Prior mixing of calcium chloride and sodium hydroxide before adding to the slurry gives no flocculation. It is also preferred that the total concentration of calcium chloride added to the suspension be above about 0.5 gram per liter, and the sodium hydroxide concentration be above about 0.09 gram per liter. It is found that below these concentrations complete flocculation and separation does not occur in a period of about 2 hours; with lower concentrations than these, only a portion of the algae is flocculated.

It is preferred that the concentration of calcium chloride and sodium hydroxide be below a concentration that will result in formation of calcium hydroxide at the solubility limit thereof. It will be recognized by one skilled in the art that the solubility limit of calcium hydroxide is dependent on the pH and temperature of the liquid. In that regard it is also preferred that the pH be maintained at a low value in order to produce better flocculation and a drier filter cake. For this reason it is preferred that the quantity of sodium hydroxide employed be at or below the stoichiometric proportion for combination with the calcium chloride for producing calcium hydroxide. It may also be desirable to add hydrochloric acid or the like to the suspension prior to addition of calcium chloride in order to lower the pH to about 6. This causes somewhat better flocculation and also causes appreciable increases in the protein content of the separated algae.

It is particularly preferred that the quantity of calcium chloride added be in the range of from about 1.0 to 2.0 grams per liter. It is also particularly preferred that the quantity of sodium hydroxide be in the range of from about 0.5 to 1.0 gram per liter. It is found in this range that substantially instantaneous flocculation of the suspension occurs, settling is rapid, and a highly desirable, dry filter cake is obtained. It is found within this range that large flocks are obtained and the resultant material is sufficiently strong to be self-filtering. That is, comparatively large holes in filtering media are quickly plugged by flocculated algae to provide a continuous filtering media; however, water continues to flow therethrough and filter cakes as thick as three-quarter inch have been built up without seriously affecting filter rate. The self-filtering characteristics of a flocculated material are beneficial in that relatively coarse and inexpensive filter media can be employed and slits or holes in the filter media are rapidly bridged over. It is also unnecessary to employ filter aids which may be nutritionally undesirable. It is also found that with additions of flocculating agents in this range that a clearer supernatant liquid is obtained over the settled material than with higher concentrations of the addition agents.

The calcium chloride and sodium hydroxide are preferably dissolved in water prior to addition to the suspension.

It is preferred that the solutions so prepared have a high concentration of the addition agents therein since it is found that high concentrations, particularly of the second flocculating agent added, help substantially in producing instantaneous flocculation. Relatively lower concentrations can be employed, however, no benefit is gained therefrom. If desired, dry powders of calcium chloride and sodium hydroxide can be sequentially added to the suspension in order to induce flocculation. It is preferred, however, to employ solutions because of the ease of measuring and handling these materials.

Upon sequential addition of calcium chloride and sodium hydroxide to an algae suspension, three stages of flocculation and settling are noted to occur. The first flocculation is virtually instantaneous upon adding the second flocculating agent, and the material that settles out is a dark green solid that settles quite rapidly leaving a light green supernatant liquid. Microscopic examination shows that this liquid contains many of the smaller algae and the first flocks settled out are principally relatively large algae. It should be noted that these examinations were conducted with algae grown under conditions where the principal species were Scenedesmus dimorphous which is a somewhat larger species of algae than Chlorella. Under other growing conditions Chlorella may be the predominant species in the algal mass.

The second flock to form is somewhat lighter green and forms more slowly. It settles slowly above the primary flock on the bottom of a quiescent vessel, and leaves a light grey colored liquid. The third material to settle out is an ash white solid, leaving a crystal clear liquid. At least a portion of this latter material that separates may include fine particles of calcium carbonate due to reaction with carbon dioxide in the air and dissolved in the liquid, but it appears to be principally composed of cell walls of dead algae that have not completely decomposed.

Since the mass of algae is particularly valuable for its protein content, it is desirable to keep the ash content as low as possible. It is therefore desirable to minimize the quantity of calcium carbonate settling out. It has been demonstrated that the flocculation provided in the practice of this invention employing small amounts of additives, giving three stages of settling, permits the separation of the minor quantity of calcium carbonate by decanting the supernatant liquid after settling of the secondary flock, but prior to settling of the extremely fine calcium carbonate. This produces a very low ash content algae. Thus, it is preferred that the material in the secondary settler 14 of the typical process be retained therein for a time only sufficient to remove the algae from the liquid in the first two stages of settling and to withdraw the supernatant at a time prior to the settling of the calcium carbonate and pass the slurry to the concentration tank 16 for further dewatering. The time required varies with the algae species, quantity of flocculating agents and pH, and is in the range of from about 10 minutes to 4 hours. Differential separation of these materials in conventional thickeners, clarifiers, or the like, is readily obtained. If desired a tertiary settler can be added to the illustrative embodiment of the drawing after the secondary settler 14 and before the optional filter 15. The minor quantity of solids removed are disposed of for land fill.

Although the process has been described for flocculation and separation of algae, it has been found that instantaneous flocculation and separation of a wide range of suspensions is achieved with sequential additions of calcium chloride and sodium hydroxide in quantities giving less than the solubility limit of calcium hydroxide. Thus clarifying of many liquids is possible by this process along with recovery of many solids without contamination with flocculants. Several examples can be cited to demonstrate the range of applicability of this process. The colloidal carbon has been separated from India ink. Color and other suspended matter has been flocculated and separated from wine. Clay is rapidly separated from suspension. Over 90% of the microorganisms in jet engine fuel are removed by sequential application of calcium chloride and sodium hydroxide. Bacteria in raw liquid sewage were reduced from about $10^8$ per milliliter to less than 100 per milliliter. Hard detergents are inactivated as indicated by very low levels of frothing after treatment according to the principles of this invention.

It has also been found that virus is removed from water or inactivated by application of the principles of this invention. Tests were conducted with diluted live (Sabin type) poliomyelitis virus vaccine. After dilution this material had a concentration of about 500 tissue culture doses of virus per milliliter. The resence of virus was verified by noting the cytopathic effect on Hela cell cultures. In every instance the untreated solution showed cell destruction typical for a very large amount of polio virus. The solution was also treated by addition of 1.0 gram per liter of calcium chloride and 0.5 gram per liter of sodium hydroxide. One hour after treatment a sample of the supernatant showed no evidence of polio virus in the same test used hereinabove. Cell controls showed no cytopathic effect due to any other factors.

Suspensions of other viruses and bacteria are also reduced by application of principles of this invention. Potable water is produced by sequential additions of calcium chloride and sodium hydroxide to fresh water that is contaminated with slit, organic debris, bacteria and viruses. This principle can be applied in large scale treatment facilities for municipal use or clarifying bodies of water such as lakes, or may be employed in smaller batch type "field kits" for purifying water in remote locations. The residue remaining after treatment is dissolved sodium chloride and the level is sufficiently low that no objectionable taste is introduced. Similarly microorganisms transferred in blood plasma can be reduced by application of the principles of this invention without introducing deleterious products. This is significant in minimizing risk of transmission of hepatitis and other disorders which may be transmitted in plasma.

Example

Flocculation and settling tests were made on aqueous suspensions of algae grown in liquid raw sewage. The growing conditions were such that the algae comprises principally Scenedesmus dimorphous with a somewhat smaller proportion of Chlorella and other species of algae. A typical suspension comprised about 0.2% by weight of algae.

In each of the tests set forth hereinafter 20 liters of algae suspension was flocculated by adding a weighed quantity of calcium chloride dissolved in water to the algae suspension and the mixture was stirred for about 30 seconds. Thereafter a measured quantity of 12 Normal sodium hydroxide was added and the mixture stirred for an additional 30 seconds. At this point 250 milliliters of slurry was placed in a graduated cylinder for determination of the settling rate as indicated by the volume of settled algae after a selected time interval. The balance of the 20 liter algae suspension was permitted to settle from 2 to 4 hours after which time about 16 liters of the supernatant liquid was removed by suction leaving 4 liters of concentrated algae.

A conventional 0.1 square foot filter leaf was then placed face downward in the suspension with about one inch clearance between the bottom of the leaf and the bottom of the container. Suction at about three inches of mercury was applied to the filter leaf with the rate of vacuum build-up controlled by a relatively small orifice. The slow build-up of suction permits an algae cake to form on the filter cloth with minimized plugging of the filter. After about 45 seconds, suction of about 17 inches of mercury is applied for a total filtering time of exactly three minutes. At the end of three minutes the filter leaf was carefully lifted vertically out of the container and held for exactly 30 seconds with the lower face of the filter horizontal to permit most of the water in the wet cake to be sucked through the filter cloth. The filter leaf was then inverted and held in a horizontal position for a total vacuum drying time of exactly three minutes.

The settling rate was determined by noting the depth of settled algae in the bottom of the 250 milliliter graduated cylinder. In most instances a clear interface could be seen between the settled algae and the supernatant. The settling time was noted at about 20 minutes and after 24 hours. The data obtained in a series of such tests with various quantities of addition agents are set forth in the following table.

| Additives | | Filter cake | | Filtrate volume, milliliters | Settled volume, milliliters/ 250 milliliters | |
|---|---|---|---|---|---|---|
| $CaCl_2$, grams/liter | NaOH, grams/liter | Yield, grams/ft.$^2$ | Solids, percent | | 20 min. | 24 hr. |
| 2.0 | 0.09 | 41.8 | 24.2 | ---------------- | (*) | 13 |
| 1.5 | 0.18 | 31.0 | 24.0 | ---------------- | (*) | 19 |
| 0.5 | 0.18 | 37.5 | 25.5 | ---------------- | (*) | ---------------- |
| 1.0 | 0.36 | 37.5 | 24.4 | ---------------- | (*) | ---------------- |
| 1.5 | 0.36 | 67.6 | 20.2 | ---------------- | *50 | 19 |
| 2.0 | 0.36 | 25.0 | 21.9 | 1,950 | 50 | 21 |
| 0.5 | 0.54 | 31.4 | 24.9 | 600 | (*) | ---------------- |
| 1.0 | 0.54 | 47.3 | 22.9 | ---------------- | *50 | 18 |
| 1.5 | 0.54 | 35.7 | 22.3 | 1,310 | 50 | 18 |
| 2.0 | 0.54 | 35.6 | 20.6 | 875 | 50 | 23 |
| 1.0 | 0.72 | 76.1 | 20.6 | ---------------- | 50 | 19 |
| 2.0 | 0.72 | 42.8 | 20.4 | 2,450 | 62 | 26 |
| 0 | 0 | 7.6 | 21.1 | 1,500 | ---------------- | ---------------- |

*Secondary flock of small algae remained in suspension.

It is to be understood that the above described examples are merely illustrative of the principles of this invention. Those skilled in the art may readily devise other variations that will embody the principles of the invention. It is therefore to be understood that within the scope of the appended claims the invention may be practiced otherwise than as specifically described.

What is claimed is:
1. A process for removing suspended solids from a liquid comprising the sequential steps of:
   mixing a first flocculating agent into the suspension; and sequentially thereafter mixing a second flocculating agent into the suspension whereby the solids are flocculated;
   said first and second flocculating agents being selected from the class consisting of calcium chloride and sodium hydroxide, whereby calcium hydroxide is formed therebetween in the liquid, the quantities of said calcium chloride and sodium hydroxide being such that the concentration of calcium hydroxide is below the solubility limit thereof in the liquid.

2. A process as defined in claim 1 wherein said sodium hydroxide is added in the range of from about 0.5 to 1.0 gram per liter.

3. A process as defined in claim 1 wherein said first flocculating agent is calcium chloride and said second flocculating agent is sodium hydroxide.

4. A process as defined in claim 3 wherein said sodium hydroxide is added in excess of about 0.09 gram per liter.

5. A process as defined in claim 3 wherein said calcium chloride is added in excess of about 0.5 gram per liter.

6. A process as defined in claim 1 wherein said solids comprise microorganisms in suspension.

7. A process as defined in claim 6 wherein said microorganisms comprise virus suspended in water.

8. A process as defined in claim 6 wherein said microorganisms comprise algae suspended in water.

9. A process as defined in claim 8 wherein said calcium chloride is first added in the range of from about 1.0 to 2.0 grams per liter, and said sodium hydroxide is sequentially thereafter added in the range of from about 0.5 to 1.0 gram per liter whereby the algae is flocculated; and further comprising the steps of:
   settling the flocculated algae; and
   separating the concentrated slurry of algae and the clarified supernatant a sufficient time after flocculation to permit a major portion of the algae to settle and an insufficient time after flocculation to permit other materials to settle.

10. A process as defined in claim 1 wherein said calcium chloride is added in the range of from about 1.0 to 2.0 grams per liter.

11. A process as defined in claim 10 wherein said sodium hydroxide is added in the range of from about 0.5 to 1.0 gram per liter.

12. A process as defined in claim 11 further comprising: lower pH of the suspension prior to adding said second flocculating agent.

13. In a waste treatment process comprising: photosynthetically growing algae in wastes in a liquid; flocculating the algae; separating the algae from the liquid; and recovering the algae as a source of protein; the improvement in said flocculating step comprising:
   mixing a first flocculating agent into the suspension of algae in liquid; and
   sequentially thereafter mixing a second flocculating agent into the suspension of algae in liquid, said first and second flocculating agents being selected from the class consisting of calcium chloride and sodium hydroxide whereby calcium hydroxide is formed therebetween in the liquid; the quantities of calcium chloride and sodium hydroxide being below an amount to form a concentration of calcium hydroxide at the solubility limit thereof in the liquid.

14. A process as defined in claim 13 wherein said calcium chloride is first added in the range of from about 1.0 to 2.0 grams per liter, and said sodium hydroxide is sequentially thereafter added in the range of from about 0.5 to 1.0 gram per liter.

15. A process as defined in claim 14 wherein said separating step includes the improvement comprising:
   settling the flocculated algae; and
   separating supernatant and settled algae a sufficient time after flocculation to permit a major portion of the algae to settle and an insufficient time after flocculation to permit a major portion of precipitated chemicals to settle.

16. A waste treatment process comprising:
   photosynthetically growing algae in organic wastes in water to form an aqueous suspension of algae;
   mixing calcium chloride with said suspension in the range of from about 1.0 to 2.0 grams per liter;
   sequentially thereafter mixing sodium hydroxide with said suspension in the range of from about 0.5 to 2.0 grams per liter whereby said algae is substantially instantaneously flocculated;
   separating a major portion of the flocculated algae from a major portion of the water;
   filtering the flocculated algae for removal of water therefrom; and
   drying filtered algae for providing a source of protein.

17. A waste treatment process as defined in claim 16 wherein said separating step comprises settling the flocculated algae; and
- separating a major portion of clarified water from a major portion of the algae after a time sufficient for settling of a major portion of the algae and before a time sufficient for settling of a major portion of other materials in the water.

18. A waste treatment process as defined in claim 17 wherein the settling time prior to separation is in the range of from 10 minutes to 4 hours for separating distinct phases of settling of flocculated algae; and further comprising:
- further settling of the flocculated algae for dewatering thereof prior to the filtering step.

References Cited
UNITED STATES PATENTS
1,802,806  4/1931  Curtis et al. _____ 210—53

OTHER REFERENCES
Golveke, C. G., et al., Harvesting and Processing Sewage-Grown Planktonic Algae, Journal WPCF, April 1965, vol. 37, pp. 471, 473–487 and 496–498 relied on (P.O.S.L.).

MICHAEL E. ROGERS, *Primary Examiner.*

U.S. Cl. X.R.

210—53, 73; 47—1.4; 99—2, 48